United States Patent
Kim et al.

(10) Patent No.: US 6,741,634 B1
(45) Date of Patent: May 25, 2004

(54) APPARATUS AND METHOD OF ADAPTIVE WEIGHTED PARALLEL INTERFERENCE CANCELLATION SYSTEM FOR CDMA

(75) Inventors: Seong Rag Kim, Taejon (KR); Sugbong Kang, Taejon (KR); In Kyeong Choi, Taejon (KR); Jeong Goo Lee, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/491,079

(22) Filed: Jan. 21, 2000

(30) Foreign Application Priority Data

Jun. 28, 1999 (JP) .......................................... 1999-25032

(51) Int. Cl.[7] .............................................. H04L 27/30
(52) U.S. Cl. ........................ 375/144; 375/148; 375/343; 375/349; 370/335; 370/342; 455/63; 455/67.3; 455/226.3
(58) Field of Search ................................. 375/130, 141, 375/142, 144, 148, 150, 343, 349; 370/335, 342; 455/63, 67.1, 67.3, 226.2, 226.3

(56) References Cited

U.S. PATENT DOCUMENTS

| | | | |
|---|---|---|---|
| 5,218,619 A | | 6/1993 | Dent .............................. 375/1 |
| 5,644,592 A | | 7/1997 | Divsalar et al. ............. 375/206 |
| 5,719,852 A | | 2/1998 | Schilling et al. ............ 370/201 |
| 6,088,383 A | * | 7/2000 | Suzuki et al. ............... 375/148 |
| 6,192,067 B1 | * | 2/2001 | Toda et al. .................. 375/144 |
| 6,363,103 B1 | * | 3/2002 | Buehrer et al. ............. 375/148 |
| 6,496,534 B1 | * | 12/2002 | Shimizu et al. ............. 375/148 |
| 6,584,115 B1 | * | 6/2003 | Suzuki ........................ 370/441 |

OTHER PUBLICATIONS

Varanasi et al., "Multistage Detection in Asynchronous Code-Division Multiple-Access Communications," *IEEE Transactions on Communications*, 38(4):509–519, Apr., 1990.

Kim et al., "Interference Cancellation Scheme with Simple Structure and Better Performance, " *Electronics Letters*, (32)23:2115–2117, Nov. 7, 1996.

Divsalar et al., Improved Parallel Interference Cancellation for CDMA, *IEEE Transactions on Communicatons*, (46)2:258–268, Feb. 1998.

Kim et al., "Adaptive Weighted Parallel Interference Cancellation for CDMA Systems," *Electronics Letters*, 34(22):1–2, Oct. 29, 1998.

* cited by examiner

*Primary Examiner*—Stephen Chin
*Assistant Examiner*—Dac V. Ha
(74) *Attorney, Agent, or Firm*—Seed IP Law Group PLLC

(57) ABSTRACT

An adaptive weighted parallel interference cancellation system for CDMA that decreases MAI (multiple access interference) and thereby increases general performance, including K stages for iterative cancellation of MAI in a received signal of a user. Each stage includes a detector, a regenerator, and a subtractor. The detector is configured to determine a tentative bit decision from a despread signal. The regenerator that is connected with the detector in parallel is configured to spread an unmodulated signal, multiply a channel phase, and multiply by the output of the detector. The subtractor uses weighted signals that are adjusted user by user and according to changing environments.

11 Claims, 5 Drawing Sheets

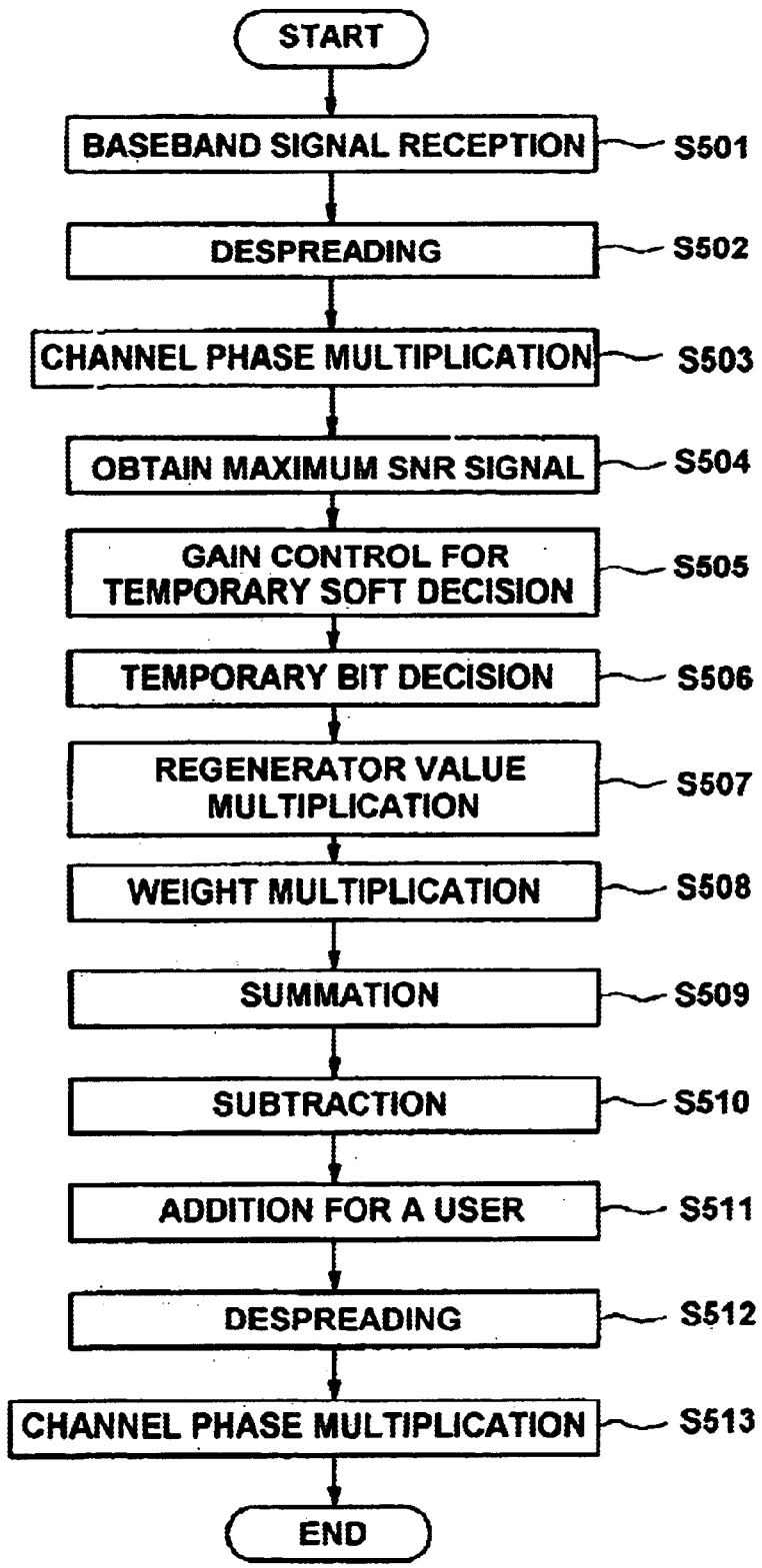

APPARATUS AND METHOD OF ADAPTIVE WEIGHTED PARALLEL INTERFERENCE CANCELLATION SYSTEM FOR CDMA

TECHNICAL FIELD

The present invention relates to an apparatus and method of an adaptive weighted parallel interference cancellation system for CDMA. More particularly, the present invention relates to an apparatus and method of a adaptive weighted parallel interference cancellation system for CDMA, which decreases multiple access interference (MAI) and thereby increases general performance.

BACKGROUND OF THE INVENTION

Direct-sequence code-division multiple access (DS-CDMA) technology is the most attractive and promising candidate for the next generation wireless communication systems such as IMT-2000 and UMTS. The performance and/or the capacity of conventional CDMA detectors are greatly influenced by the MAI contributed by the other users. Even though optimal multi-user detection is not interference-limited, it is too complex to be implemented. Thus, a compromise between performance and system complexity gives a birth to sub-optimal multi-user detection like the interference cancellation (IC), including successive IC (SIC) and parallel IC (PIC). To achieve the acceptable performance improvement with the conventional PIC (CPIC), in which the total amount of the MAI estimate is cancelled at each stage of iteration, accurate channel estimation and bit decision are required. However, they are not guaranteed in low signal to noise and interference ratio (SNIR) situations.

To overcome the drawback of the CPIC, a few modified CPIC schemes were proposed based on similar idea. One is the adaptive hybrid serial/parallel IC (AHSPIC), which is devised for the (multi-path) fading environments. The basic idea of the AHSPIC is that it keeps the detectors with low SNIR input signals from participating in cancellation. That is, the detectors not involved in earlier cancellations are to be included in later cancellations when sufficient SINR is guaranteed after canceling the signals with high power in earlier cancellations.

The Partial PIC (PPIC) is another approach designed with focusing on the case of fixed channels with equal power. In the PPIC the partial amount of MAI estimate is cancelled at each stage of iteration. As the IC operation progresses, the fidelity of estimates for regeneration of the MAI goes up and thus the weight determining the amount of the MAI estimate being cancelled increases. The tentative soft decision of the PPIC at the present stage is obtained as a weighted sum of soft tentative decision available at the previous stage and the received signal from which MAI estimate is cancelled out. As a result, the performance improvement is not good enough and the whole system gets complicated.

SUMMARY OF THE INVENTION

The present invention provides an apparatus and method of an adaptive weighted parallel interference cancellation system for CDMA that obtains MAI-reduced signals using adaptive weighted subtraction of interference.

An apparatus of an adaptive weighted parallel interference cancellation system for CDMA comprises K stages for iterative cancellation of MAI in received signal. Each stage comprises a detector, a regenerator, and a subtractor. The detector determines tentative bit decision from the despread signal of a user. The regenerator that is coupled to the detector in parallel spreads an unmodulated signal, multiplies a channel phase, and multiplies by the output of the detector. The subtractor obtains MAI-cancelled signal on the basis of the adaptive weight adjustment.

Desirably, the detector comprises a matched filter, a real-part selector, a gain controller, and a finite-bit quantizer. The matched filter obtains maximum SNR (signal to noise ratio) from the despread signal of a user. The real-part selector extracts a real-part from the despread signal of a user with maximum SNR. The gain controller adjusts the gain depending upon the fidelity of the output signal of the real-part selector. The finite-bit quantizer quantizes the gain-adjusted signal from the gain controller. The finite-bit bit quantizer performs the hard decision for the signal larger than one and the soft decision for the signal less than one.

Desirably, the regenerator comprises a spreading code multiplier, a pulse shaping filter, a channel phase multiplier, and a multiplier. The spreading code multiplier multiplies the unmodulated signal by the spreading code of a user. The pulse shaping filter shapes the output signal of the spreading code multiplier. The channel phase multiplier multiplies the channel phase of a user by the output signal of the pulse shaping filter. The multiplier multiplies the output signal of the channel phase multiplier by the output signal of the detector.

Desirably, the subtractor comprises a weight multiplier, a first adder, a subtractor, and a second adder. The weight multiplier multiplies the output signal of the multiplier by the weight of the present stage. The first adder sums weight multiplied signals of all users. The subtractor subtracts the output signal of the first adder from the received baseband signal. The second adder adds the output signal of the weight multiplier to the output signal of the subtractor and thereby MAI-cancelled signal of a user is obtained.

The subtractor further comprises a first multiplier and a second multiplier. The first multiplier multiplies the output signal of the second adder by spreading code of a user. The second multiplier multiplies the output signal of the first multiplier by the channel phase and thereby phase difference is compensated.

A method of an adaptive weighted parallel interference cancellation system for CDMA comprises the following:

a) Tentative bit decision is made on the basis of the despread signal of a user.

b) The unmodulated signal is spread and a channel phase is multiplied.

c) The tentatively decided bit is multiplied by the spread and phase-multiplied signal and thereby the transmitted signal of a user is generated.

d) The received signal is multiplied by the weight and MAI-cancelled signal of a user is generated.

e) The above a), b), c), and d) steps for canceling MAI.

Desirably, the tentative bit decision comprises the following: First, maximum SNR from the despread signal of a user is obtained. Second, real parts from the despread signal having maximum SNR are extracted. Third, the gain of extracted real parts from the despread signal is controlled. Fourth, tentative bit decision of the gain-controlled signal is made.

Desirably, b) and c) from above comprises as follows: First, multiply unmodulated signal by spreading code of a user. Second, shape the output signal of the previous step. Third, multiply the shaped output signal of the previous step by channel phase of a user. Fourth, multiply the shaped output signal of the second step by the tentatively decided bit from a) above. Desirably, d) from above comprises as follows: First, multiply the received signal of a user by the weight of the present stage. Second, sum the weight multiplied signals of all users. Third, subtract the summed signals from the received baseband signal. Fourth, add the output signal of the first step to the output signal of the third step and an MAI-cancelled signal is obtained. Desirably, the third step comprises the following two steps. First is to multiply the MAI-cancelled signal of a user by the spreading code of a user. Next is to multiply the output signal of the first step by the channel phase and thereby the phase of the channels reflected.

BRIEF DESCRIPTION OF THE DRAWINGS

FIG. 5 shows a flowchart for illustrating the method of the adaptive weighted parallel interference cancellation system for CDMA in accordance with an embodiment of the present invention.

DETAILED DESCRIPTION OF THE PREFERRED EMBODIMENTS

Figure 1A:
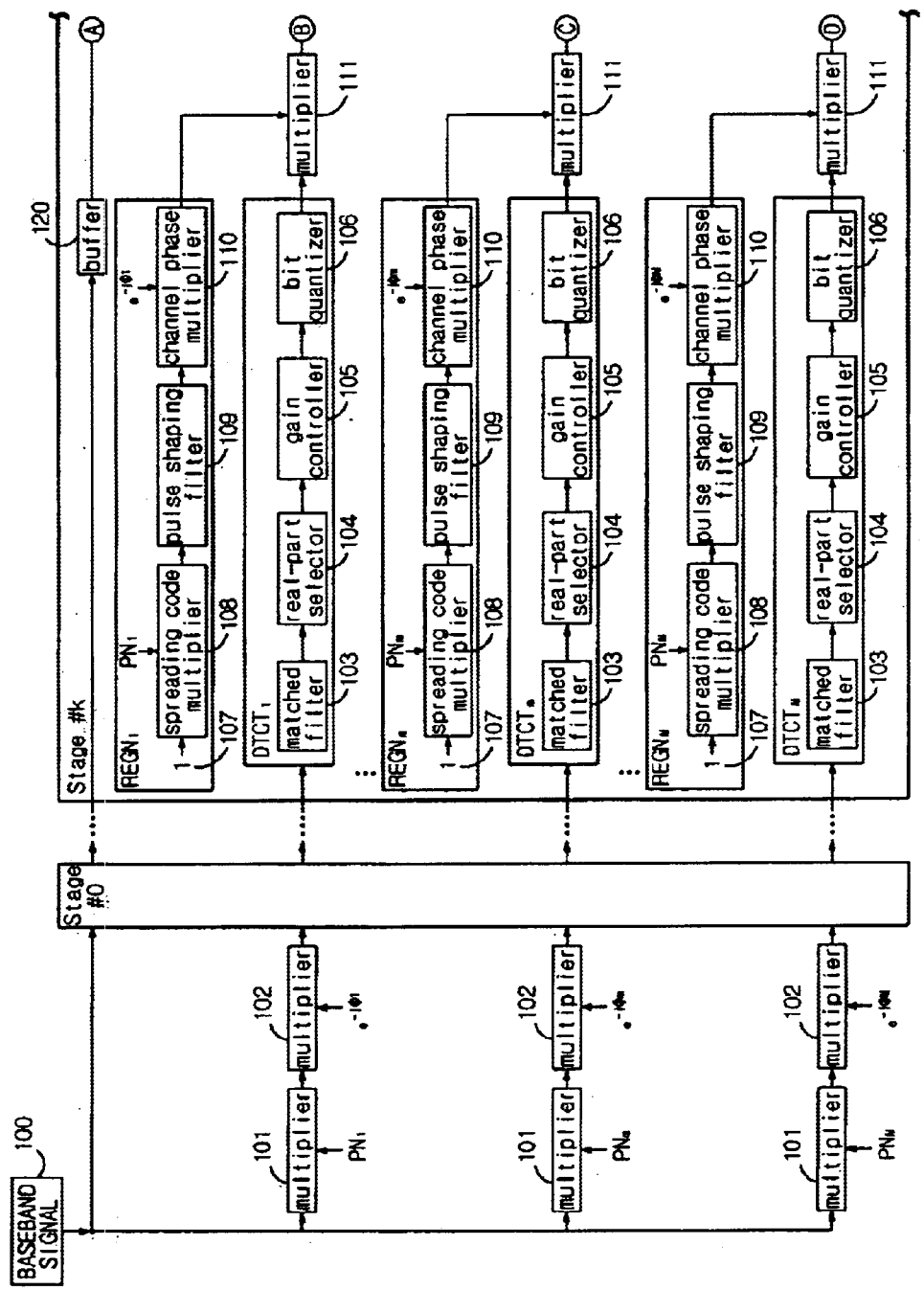
FIGS. 1A and 1B show a block diagram for illustrating the multistage implementation of the adaptive weighted parallel interference cancellation system for CDMA in accordance with the present invention.
Figure 1B:
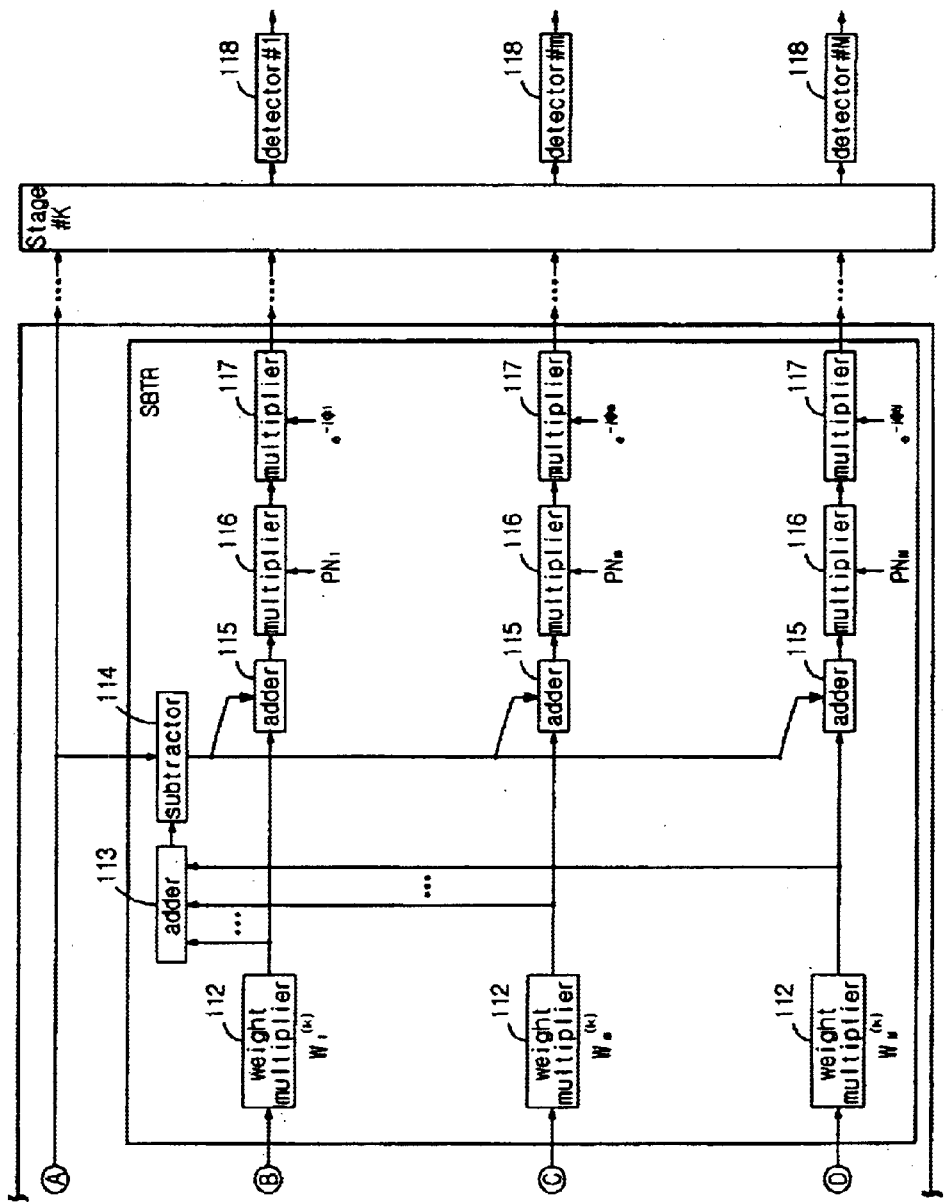

FIGS. 1A and 1B show the block diagram for illustrating the multistage implementation of the adaptive weighted parallel interference cancellation system for CDMA in accordance with the present invention.

The received baseband signal 100 includes signals of the user 1 through user M. The same processings for canceling MAI are applied to all users in the system. Here, user m is selected for a brief explanation. The baseband signal 100 is supplied to user m. The baseband signal 100 of user m is multiplied by the spreading code, $PN_m$, which means baseband signal 100 is despread by a first multiplier 101. A second multiplier 102 multiplies signals by $-\phi_m$ and compensates phase difference. The output signals of the second multiplier 102 are supplied to an apparatus of the adaptive weighted parallel interference cancellation system.

The apparatus of the adaptive weighted parallel interference cancellation system includes K stages wherein K is a natural number greater than or equal to "0", and each stage has the same structures except the weight. The weight for the first stage 0 is smaller than that for the last stage K.

Each stage of the apparatus of the adaptive weighted parallel interference cancellation system comprises detectors (DTCT), regenerators (REGN), and subtractors (SBTR). Detectors, regenerators, and subtractors are allocated to all users in the system.

An input signal is supplied to a matched filter 103 of a detector and the signal of maximum SNR is obtained. A real-part selector 104 selects the real part of this signal of maximum SNR and a gain controller 105 controls the gain of the real values. After the gain control for tentative soft decision, a bit quantizer 106 makes a tentative bit decision.

The spreading code multiplier 108 at a regenerator ($REGM_m$) multiplies the spreading code of user m ($PN_m$) by an unmodulated signal. The pulse shaping filter 109 shapes the output signal of the spreading code multiplier. Channel phase multiplier 110 multiplies the output signal of the pulse shaping filter 109 by channel phase $-\phi_m$ and thereby phase change due to the channel is reflected. The multiplier 111 multiplies the output signal of the regenerator ($REGM_m$) by the output signal of the detector ($DTCT_m$).

In case the detector ($DTCT_m$) is serially connected with the regenerator ($REGM_m$) and thereby signals are regenerated using the output of the detector ($DTCT_m$), the pulse shaping filter 109 is required to be able to handle a real part signal. On the contrary, the detector ($DTCT_m$) is connected with the regenerator ($REGM_m$) in parallel and the unmodulated signal goes through the pulse shaping filter 109 in the present invention. As a result, only the amplitude of the signal needs to be adjusted through the output of the detector ($DTCT_m$). The pulse shaping filter 109 is required to handle only binary signals and it can have a relatively simple structure.

A subtractor ($SBTR_m$) cancels MAI using the signals regenerated by the detector ($DTCT_m$) and the regenerator ($REGM_m$). The weight multiplier 112 multiplies the signals of user m by the weight. The weight is adaptively determined by the fidelity of estimation of the regenerated signal.

The first adder 113 sums weight multiplied signals from user 1 to user M. The subtractor 114 subtracts this summed signal from the signal stored in the buffer 120. The second adder 115 sums signals for user m and the output signal $u_m^{(k)}$ in which MAI has been cancelled is obtained. The output signal $u_m^{(k)}$ is multiplied by $PN_m$ for despreading and then multiplied by $-\phi_m$ for phase compensation.

$$u_m^{(k)} = r(t) - \sum_{j=1, j \neq m}^{M} w_j^{(k)} \hat{I}_j^{(k)} \qquad \text{[Equation 1]}$$

$\hat{I}_j^{(k)}$: regenerated signal for user $j^{th}$ stage $k^{th}$
r(t): received signal
$w_j^{(k)}$: weight at stage $k^{th}$ of user $j^{th}$
M: total number of users in the system
t: time
K: total stage number
wherein $0 \leq k \leq K$ and j, K, m and M are a natural number.

In this embodiment, the optimum weights for all users are obtained by minimizing the mean square error (MSE) and it is shown in equation 2.

$$E\left[\left\|r(t) - \sum_{j=1}^{M} w_j^{(k)} \hat{I}_j^{(k)}\right\|^2\right] \qquad \text{[Equation 2]}$$

The weights depend on the confidence on $\hat{I}_j^{(k)}$, that is, on the correlation between $\hat{I}_j^{(k)}$ and $I_j^{(k)}$. Since the exact knowledge of correlation is not given in practice, the least mean square (LMS) algorithm which employs a recursive method is applied. To obtain the weights for i-th user by LMS is shown in equation 3.

$$\tilde{w}_i^{(k)}(n+1)=\tilde{w}_i^{(k)}(n)+\mu \hat{d}_i^{(k)}(n)\tilde{e}^{(k)}(n) \quad [\text{Equation 3}]$$

$\mu$: step size of LMS algorithm

Estimation of error $\tilde{e}^{(k)}$ in the LMS algorithm is shown in equation 4.

$$\tilde{e}^{(k)}(n) = r(n) - \sum_{j=1}^{M} \tilde{w}_j^{(k)}(n)\hat{I}_j^{(k)}(n) \quad [\text{Equation 4}]$$

However, due to nonergodicity of $\hat{I}_i^{(k)}$ in practice, the weight $\tilde{w}_i^{(k)}$ is a smoothed value of $w_i^{(k)}$ which minimizes Equation 2.

Figure 2:
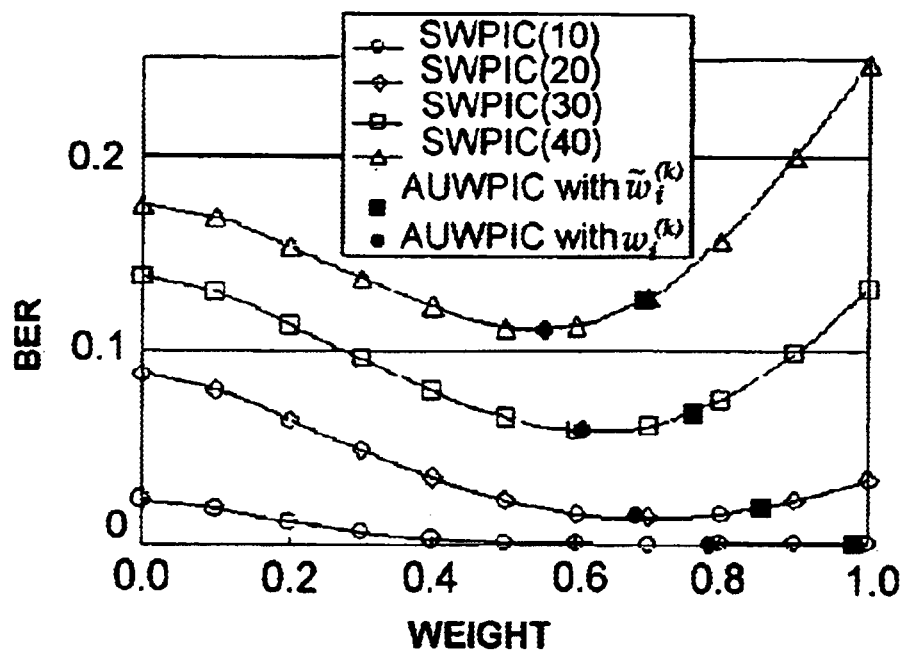
FIG. 2 shows a graph for illustrating both the BER performances of the stage-by-stage weighted parallel interference cancellation (SWPIC), where the weights in each stage are equal, and the adaptive user-by-user weighted parallel interference cancellation (AUWPIC) against the weight and number of users.

FIG. 2 shows a graph for illustrating the BER performances of the stage-by-stage weighted parallel interference cancellation (SWPIC) and the adaptive user-by-user weighted parallel interference cancellation (AUWPIC) against the weight and number of users. The received powers of all users are set to be equal. The weight $\tilde{w}_i^{(k)}$ obtained by the LMS algorithm is different from the weight $w_i^{(k)}$ minimizing the BER (or MSE) since $\tilde{w}_i^{(k)}$ is the smoothed value of $w_i^{(k)}$ by a scale factor. It was found that, by experiment, $\kappa \ \tilde{w}_i^{(k)}$ (n) with a scale factor $\kappa \approx 0.8$ minimizes the BER regardless of number of users in the system.

Figure 3:
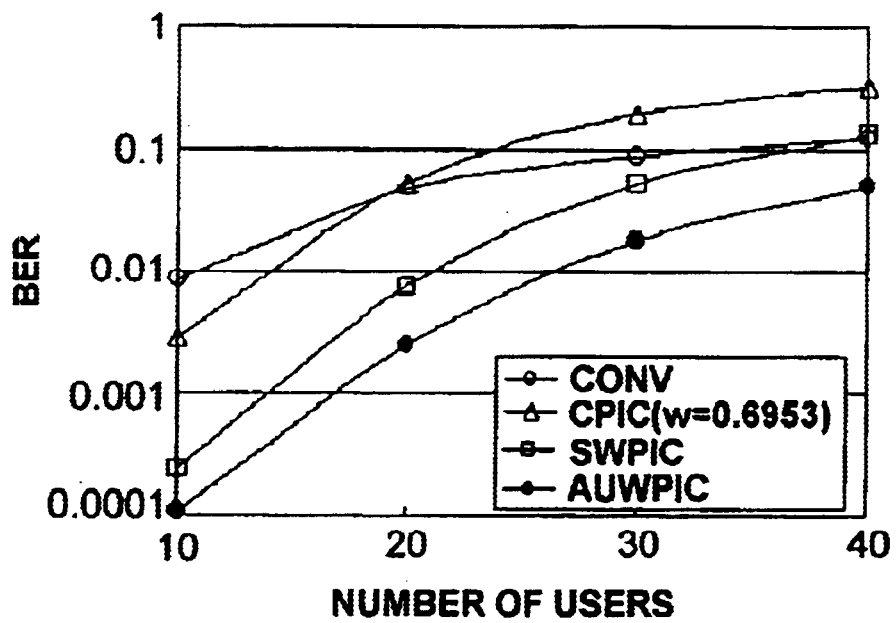
FIG. 3 shows a graph for illustrating the comparison of BER performances of AUWPIC and other PIC schemes for users in high power group.

In practice, the received powers of all users are not equal. In experiments, two user groups are assumed with the same number of users; the received powers of users in each group are set to be equal and the one group has lower power than the other by 6 db. With two user groups, FIG. 3 compares BER performances of AUWPIC and other PIC schemes for users in high power (0 dB) group. The weights of AUWPIC for different received power and number of users are given in Table 1. The weight of SWPIC is chosen as the weight (0.6953) of AUWPIC in high power group when the number of users is 20. We see that the weights of AUWPIC are adjusted to the received power and number of users. In FIG. 3, the performance degradation of SWPIC is caused, since the weight is not optimal for a low power group (−6 dB) even when the number of users is 20. For all numbers of users, AUWPIC shows performance improvement over the others. For large number of users, it is shown CPIC is inferior to the conventional receiver.

TABLE 1

Weights of AUWPIC and SWPIC with two user groups

| Number of users | AUWPIC | | SWPIC |
|---|---|---|---|
| | 0dB | −6dB | |
| 10 | 0.7701 | 0.4773 | 0.6953 |
| 20 | 0.6953 | 0.3836 | |
| 30 | 0.6279 | 0.3445 | |
| 40 | 0.5702 | 0.3236 | |

Figure 4:
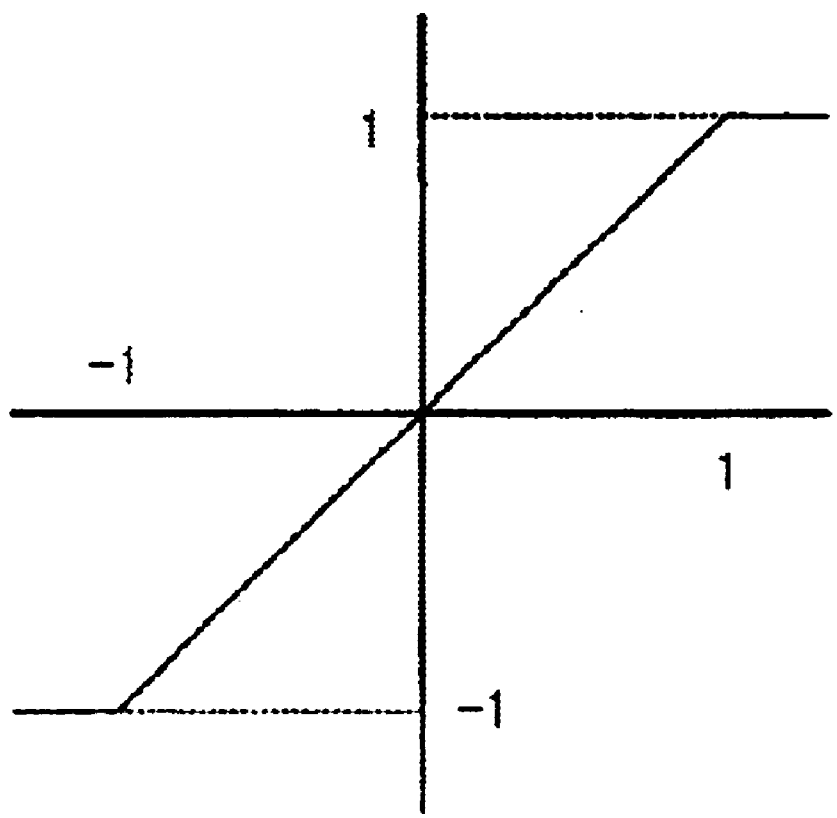
FIG. 4 shows a graph for illustrating the transfer function of a linear finite-bit quantizer.

FIG. 4 shows a graph for illustrating the transfer function of linear finite-bit quantizer.

This finite-bit quantizer has advantages of hard decision and soft decision. In addition, its transfer function is fairly close enough to the optimal hyperbolic tangent function in terms of MMSE (minimum mean square error) and it can be implemented with linear components. A gain controller is placed at the prior stage, and the slope of the transfer function can be adjusted on the basis of the fidelity of input signals.

FIG. 5 shows a flowchart for illustrating the method of the adaptive weighted parallel interference cancellation system for CDMA in accordance with an embodiment of the present invention.

At stage S501, baseband signals that are transmitted from the CDMA transmitter for user 1 through user m are received. At stage S502, the signals are multiplied by $PN_m$ for despreading and then channel phase $-\phi_m$ is multiplied for phase compensation at stage S503.

At stage S504, maximum SNR signal is obtained by passing the input signal of user m through the matched filter. At stage S505, the gain control for tentative soft decision is performed. Then, the quantization of tentative bit decision is performed at stage S506.

At stage S507, the unmodulated signal is multiplied by $PN_m$. $PN_m$ is the spreading code of user m. The spread signals are supplied to the phase-shaping filter. The output signal of the phase-shaping filter is multiplied by channel phase $-\phi_m$ and thereby multiplication of the channel phase is performed. Finally, the phase-multiplied signal is multiplied by the output of stage S506.

At stage S508, the signal for user m is multiplied by a weight for stage k. At stage S509, signals from user 1 to user m are summed up. A subtraction is performed at stage S510 and the output signal of S510 is added to the weight-multiplied signal of user m.

The output signal of S511 is multiplied by $PN_m$ at stage S512 and the output signal of S512 is multiplied by channel phase $-\phi_m$ at stage S513.

PPIC uses not only the bit decision of the present stage but also that of the previous stages. Since the present invention provides an apparatus and method of the adaptive weighted parallel interference cancellation system for CDMA which manipulates only the bit decision of the present stage, not the previous stages, its complexity becomes considerably simpler.

Although the preferred embodiments of the present invention have been disclosed for illustrative purposes, those skilled in related art will appreciate that various modifications, additions and substitutions are possible, without departing from the scope and spirit of the invention as recited in the accompanying claims.

What we claim:

1. An apparatus for an adaptive weighted parallel interference cancellation system for a CDMA receiver, comprising: k stages for iterative cancellation of MAI (multiple access interference) in a received signal of a user, wherein each stage comprises:

a detector for determining tentative bit decision from despread signals of an arbitrary user m, wherein 1<m<M and m, M are natural number;

a regenerator connected with said detector in parallel for spreading unmodulated signal, for multiplying a channel phase, and for multiplying by an output of said detector; and a subtractor for obtaining an MAI-cancelled signal on the basis of the weight and input signals of said detector wherein said detector includes:

a matched filter for obtaining maximum SNR from the despread signal of the user m;

a real-part selector for extracting a real-part from the despread signal of the user m with the maximum SNR;

a gain controller for adjusting gain as a function of a fidelity of an output signal of said real-part selector; and a finite-bit quantizer for receiving gain-adjusted signals from said gain controller and quantizing the tentatively decided bit.

2. The apparatus of claim 1, wherein said finite-bit quantizer performs a hard decision or a soft decision.

3. The apparatus of claim 1, wherein said regenerator includes:
- a spreading code multiplier for multiplying the unmodulated signal by a spreading code of the user m;
- a pulse-shaping filter for shaping an output signal of said spreading code multiplier;
- a channel phase multiplier for multiplying the channel phase of the user m by an output signal of said pulse shaping filter; and
- a multiplier for multiplying an output signal of said channel phase multiplier by an output signal of said detector.

4. The apparatus of claim 3 wherein said subtractor includes:
- a weight multiplier for multiplying an output signal of said multiplier by weight of present stage;
- a first adder for summing weight multiplied signals of all users;
- a subtractor for subtracting an output signal of the first adder from the received signal; and
- a second adder for adding an output signal of said weight multiplier to an output signal of said subtractor and thereby obtaining the MAI-cancelled signal of the user m.

5. The apparatus of claim 4, wherein said subtractor further comprises:
- a first multiplier for multiplying an output signal of said second adder by a spreading code of the user m; and
- a second multiplier for multiplying an output signal of said first multiplier by the channel phase and thereby compensating a phase difference.

6. The apparatus of claim 4, wherein the weight of the present stage changes adaptively to minimize the following equation:

$$E\left[\left|r(t) - \sum_{j=1}^{M} w_j^{(k)} \hat{I}_j^{(k)}\right|^2\right]$$

$\hat{I}_j^{(k)}$: estimated value of $I_j^{(k)}$ (or regenerated signal) for user $j^{th}$ stage $k^{th}$,
r(t): received signal,
$w_j^{(k)}$: weight at stage $k^{th}$ of user $j^{th}$, and
M: total number of users in the system,
t: time
K: total stage number
wherein $0 \leq k \leq K$ and j, K, m and M are a natural number.

7. A method of an adaptive weighted parallel interference cancellation system for a CDMA receiver comprising the steps of:
a) making a tentative bit decision on the basis of a despread signal of an arbitrary user m, wherein 1<m<M to obtain a tentatively decided bit, and m, M are natural number;
b) spreading an unmodulated signal and multiplying by a channel phase to obtain a spread and compensated signal;
c) multiplying the tentatively decided bit by a spread and compensated signal and generating, a received signal of the user m;
d) multiplying the received signal by a weight and generating an MAI-cancelled signal of the user m; and
e) Iterating steps a), b), c), and d) and canceling MAI and canceling MAI in received signals of each of users 1 to M wherein the step a) comprises:
- obtaining maximum SNR from the despread signal of the user m;
- extracting a real part from the despread signal having the maximum SNR;
- controlling gain of an extracted real part from the despread signal; and
- making a tentative bit decision of the gain-controlled signal.

8. The method of the adaptive weighted parallel interference cancellation system for CDMA according to claim 7, wherein b) and c) comprise:
- multiplying the unmodulated signal by a spreading code of the user m to obtain a multiplied signal;
- shaping the multiplied signal to obtain a shaped signal;
- multiplying the shaped signal by the channel phase of the user m; and
- multiplying the shaped signal by the tentatively decided bit.

9. The method of claim 8, wherein d) comprises:
- multiplying the received signal of the user m by the weight of the present stage to obtain a weight-multiplied signal;
- summing weight-multiplied signals of all users to obtain a summed signal;
- subtracting the summed signal from a received baseband signal of the user to obtain a remainder signal; and
- adding the weight-multiplied signal to the remainder signal and thereby obtain the MAI-cancelled signal.

10. The method of claim 9, wherein subtracting the summed signal comprises:
- multiplying an MAI-cancelled signal of the user m by a spreading code of the user m to obtain a first multiplied signal; and
- multiplying the first multiplied signal by the channel phase and thereby compensating for phase difference.

11. The method of claim 9, wherein the weight of the present stage changes adaptively to minimize the following equation:

$$E\left[\left|r(t) - \sum_{j=1}^{M} w_j^{(k)} \hat{I}_j^{(k)}\right|^2\right]$$

$\hat{I}_j^{(k)}$: estimated value of $I_j^{(k)}$ for user $j^{th}$ stage $k^{th}$,
r(t): received signal,
$w_j^{(k)}$: weight at stage $k^{th}$ of user $j^{th}$, and
M: total number of users in the system,
t: time
K: total stage number
wherein $0 \leq k \leq K$ and j, K, m and M are a natural number.

* * * * *